United States Patent [19]

Akiike et al.

[11] Patent Number: 5,046,227

[45] Date of Patent: Sep. 10, 1991

[54] METHOD FOR MAKING AN INVERSION SPRING FOR THERMAL OVERLOAD RELAY

[75] Inventors: Katsumi Akiike; Nobuhiro Sekine; Tadashi Matsuoka; Tsutomu Oyama, all of Kanagawa, Japan

[73] Assignee: Fuji Electric Co., Ltd., Kanagawa, Japan

[21] Appl. No.: 568,898

[22] Filed: Aug. 17, 1990

Related U.S. Application Data

[62] Division of Ser. No. 7/407,290, Sep. 14, 1989.

[30] Foreign Application Priority Data

Sep. 20, 1988 [JP] Japan ............................... 63-235463

[51] Int. Cl.[5] ............................................. B23P 13/00

[52] U.S. Cl. ........................................ 29/173; 29/622; 200/407; 267/159

[58] Field of Search .................. 29/173, 622; 267/159, 267/163; 200/406, 407

[56] References Cited

U.S. PATENT DOCUMENTS

| | | | |
|---|---|---|---|
| 2,324,798 | 7/1943 | Nordberg | 200/407 |
| 2,777,032 | 1/1957 | Burch | 267/159 |
| 4,118,610 | 10/1978 | Purssell et al. | 29/622 |
| 4,250,367 | 2/1981 | Rossi | 29/622 |
| 4,653,179 | 3/1987 | Neumann-Henneberg et al. | 29/622 |
| 4,796,355 | 1/1989 | Burch et al. | 29/756 |
| 4,803,774 | 2/1989 | Morris et al. | 29/622 |

*Primary Examiner*—P. W. Echols

*Attorney, Agent, or Firm*—Finnegan, Henderson, Farabow, Garrett, and Dunner

[57] ABSTRACT

An inversion spring unit for a thermal overload relay and method for making the same, comprising a support member, a spring plate having a first end, a second end, an elongated central axis, and first and second side portions disposed on opposite sides of the central axis, the side portions being bent towards each other at the first end and attached at the first end to the support member for causing the second end of the spring plate to curve in a first direction away from the central axis, and a lug disposed intermediate the first and second ends for selective engagement with a drive portion to cause the second end of the spring plate to curve in a second direction opposite the first direction.

9 Claims, 5 Drawing Sheets

METHOD FOR MAKING AN INVERSION SPRING FOR THERMAL OVERLOAD RELAY

This is a division of application Ser. No. 07/407,290, filed Sept. 14, 1989.

BACKGROUND OF THE INVENTION

1. Field of the Invention

The present invention relates to an inversion spring and more particularly to an inversion spring contact driver of a thermal overload relay.

2. Description of the Related Art

Referring to FIGS. 5, 6, 7, and 8 which show a conventional thermal overload relay, FIG. 5 is a front view of a major part of the relay in the reset position, and FIG. 6 is a front view of the major part of the relay in the set position. FIG. 7 is a plan view of inversion spring unit of the relay. FIG. 8 is a side view of FIG. 7.

The contact unit 3 of the relay is disposed in the electrically insulating case 20 of the relay. The contact unit 3 comprises a movable contact support *3a* having a coupling hole *3b* at one end of contact support *3a*. Contact support *3a* is disposed to fit in groove *20a* of case 20 so as to be slideable in the axial direction of the support. A normally-closed and a normally-open movable contact *3e* and *3f* are disposed on support *3a*, respectively adjacent to normally-closed and normally-open fixed contacts *3c* and *3d*. The fixed contacts *3c* and *3d* are disposed in the case for selective contact with their respective movable contacts. A return rod *3h* which is guided by the case so that the rod can be engaged with the projection *3g* of the support to return the contact unit to the reset position. The inversion mechanism 4 of the relay comprises a see-saw-type release lever 4A pivotably supported in case 20 and engaged at one end of the lever with a shifter 2 and at the other end with an inversion spring unit 4B. Shifter 2 is moveable with a bimetal 1 and inversion spring unit 4B is engageable with the other end of the lever and is secured at the butt of the inversion spring unit to an inverting position adjuster 5. Position adjuster 5 is engaged in the coupling hold *3b* of the movable contact support *3a* at the free tip of the spring unit so that the posture of the spring unit is inverted by the swing of the lever. As shown in FIGS. 7 and 8, the inversion spring unit 4B comprises first and second springs 4B1 and 4B2, respectively. The first spring 4B1 is made of an oblong spring plate, and has a long and short tongue 4B11 and 4B12, respectively, that are formed by cutting and bending the central portion of the plate. Each of tongues 4B11 and 4B12 have free ends. The short tongue 4B12 can be moved through the opening 4B13 of the long tongue 4B11. The second spring 4B2 is shaped as a U, and has an arm 4B21 resiliently engaged with the edge of the first spring 4B1 at the opening 4B13 thereof as a movable joint. Second spring 4B2 has another arm 4B22 resiliently engaged with the end of the short tongue 4B12 as a movable joint. The inverting position adjuster 5 comprises a support member 5A which is obtusely bent and has a short lug 5A1 having a sharp-edged tip engaged in the V-groove *20b* defining a fulcrum on the inside surface of the case 20. This arrangement allows position adjuster 5 to pivot about lug 5A1. Position adjuster 5 also includes a long lug 5A2 to which the fulcrum of the first spring 4B1 is secured. Adjusting screw 5B engaged in the tapped hole 5A3 of long lug 5A2 so as to be movable back and forth, and a compressed spring 5C is interposed between the intermediate portion of long lug 51A and the inside surface of the case.

When the release lever 4A of the inversion mechanism 4 is swung clockwise by the shifter 2, the tip of the lever pushes the short tongue 4B12 of the first spring 4B1 of the inversion spring unit 4B. When the short tongue 4B12 is thereby moved through the opening 4B13 in which the inversion dead point for the short tongue is located, the posture of the long tongue 4B11 is inverted by the second spring 4B2 so that the normally-closed movable contacts *3e* of the contact unit 3 are disengaged from the normally-closed fixed contacts *3c*, and the normally-open movable contact *3f* of the contact unit are engaged with the normally-open fixed contacts *3d* thereof, as shown in FIG. 6. In order to return the contact unit 3 into the original state after that, the return rod *3h* is pushed down to move the projection *3g* of the movable contact support *3a* rightward as shown by a dotted line in FIG. 6. This causes the posture of the long tongue 4B11 to invert back beyond the dead point to return the first spring 4B1 to its original state as shown in FIG. 5. The position of the inversion dead point can be adjusted in a stepless manner by moving the adjusting screw 5B of the inverting position adjuster 5 back and forth with the use of a screwdriver to move the inversion spring unit 4B as a whole, depending on the force of the compressed spring 5C.

An inherent problem with the prior art device described above is that friction between the first and second springs displaces the dead point of the spring unit. Specially, the arms 4B21 and 4B22 of the second spring 4B2 of the inversion spring unit 4B, which functions as the contact driver of the conventional thermal overload relay, are resiliently engaged with the edge of the first spring 4B1 of the spring unit at the opening 4B13 of the first spring and with the tongue 4B12 thereof, respectively, causing friction at the points of the engagement of the first and second springs. Another problem with the prior art device is that since the first and second springs 4B1 and 4B2 need to be engaged with each other, it is difficult to automatically assemble the inversion spring unit.

The present invention overcomes the problems of the prior art by providing an improved inversion spring unit for a thermal overload relay that has a simple construction, is easy to assemble, and whose inversion dead point is kept in a fixed position.

SUMMARY OF THE INVENTION

The inversion spring unit of the present invention is the contact driver of a thermal overload relay. A single thin spring plate is punched so that a central lug and both slender side portions, each of which has a hole at one end of the portion, are formed. The holes of the slender side portions are moved toward each other in the same plane. A support member is fitted in the holes and then caulked to the slender side portions so that the slender side portions are curved as plate springs. The tip portion of the inversion spring unit, to which the other ends of the slender side portions extend, serves as a contact drive portion. The central lug serves as an inverting portion to be pushed to reverse the curvature of the slender side portions.

Since punching the single thin spring plate forms the central lug, and since both the slender side portions have holes that are moved towards each other in the same plane, and since the support member is caulked to the slender side portions at the holes, the curvature of each of the side slender portions is kept constant. As a result, the inversion dead point of the spring unit is kept stable.

According to the present invention, and as described earlier, the inversion spring of an inversion spring unit, which is the contact driver of a thermal overload relay, is made of a single thin spring plate punched so that the inversion spring is formed with a central lug and two slender side portions, each having a hole at one end. After punching, the spring plate is processed so that the holes of the slender side portions are moved toward each other in the same plane. The projections of a support member are fitted in the holes of both the slender side portions of the inversion spring and then calked thereto so that the support member and the inversion spring are secured to each other to constitute the inversion spring unit, and both the slender side portions are curved as plate springs. The tip portion of the inversion spring unit, to which the other ends of both the slender side portions extend, serves as a contact drive portion. The central lug serves as an inverting portion to be pushed to reverse the curvature of both the slender side portions. As a result, the effects mentioned below are produced.

(1) Since both the slender side portions are moved toward each other by bending the coupling portion of the inversion spring between the slender side portions to protrude the coupling portion, the dimensional irregularity of the inversion spring unit at the time of the calking is reduced by the presence of the coupling portion. In addition, the slender side portions are prevented from being nonuniformly moved toward each other, and the change in the stiffness of the inversion spring due to the irregularity of the thickness of the spring plate can be controlled by altering the amount of bending.

(2) The number of assembly steps of the inversion spring unit is greatly reduced to lower production costs. This is because the unit is constructed so that punching the spring plate to make the outline of the unit, bending, and caulking can be performed as the plate is kept in a cope and a draft used for pressing the plate.

(3) Since the inversion spring unit has no portions that slide on each other, the dead point beyond which the posture of the unit is inverted is stable.

(4) Since the thickness of the inversion spring unit is small, the relay can be made compact.

(5) Since the inversion spring unit is an integrated unit, it is easy to automatically assemble the unit in the body of the relay.

DESCRIPTION OF THE PREFERRED EMBODIMENT

An embodiment of the present invention will now be described in detail with reference to the drawings attached hereto.

Figure 1:
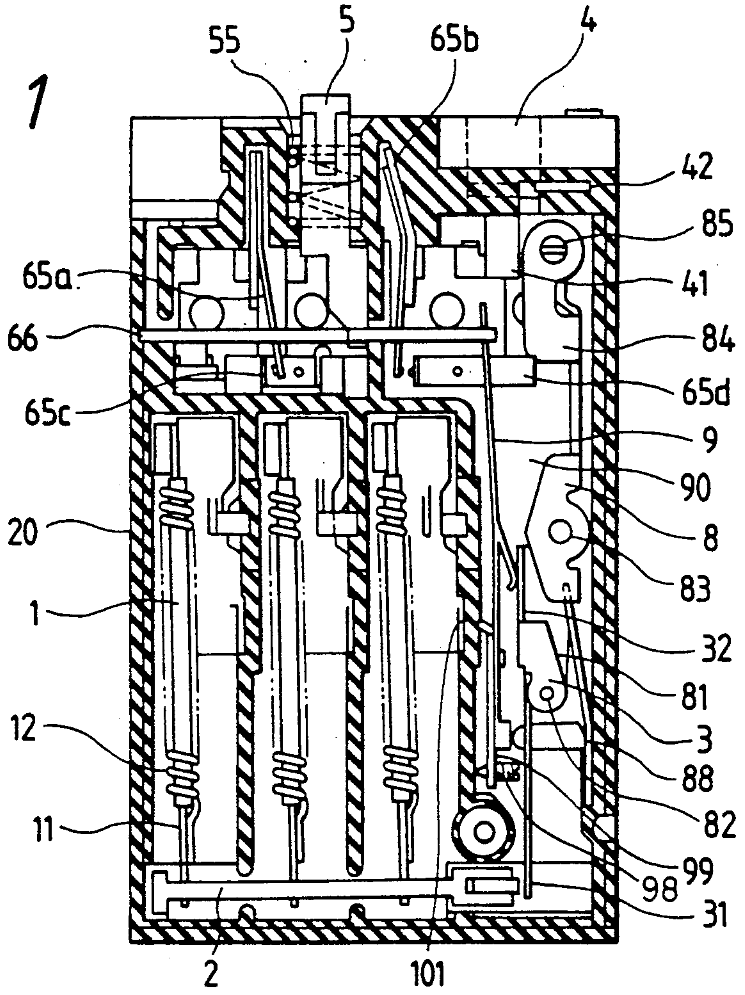
FIG. 1 is a rear cross-sectional view of a major part of a thermal overload relay including a spring unit in accordance with the present invention.

FIGS. 1, 2, 3, and 4 show an inversion spring unit for a thermal overload relay. FIG. 1 is a rear view, of a major part of the relay with the rear cover removed from the electrically insulating case 20. The frame of the case 20 is depicted by cross-hatching in FIG. 1. Three thermal units 1, each of which is composed of a bimetal 11 and a heater 12, are juxtaposed with each other to form a main three-phase circuit. The free end of the bimetal 11 is engaged with a shifter 2 whose tip faces the temperature compensation bimetal 31 of a release lever 3 provided alongside the thermal units 1. The release lever 3 is supported by a pin 82 provided on the first portion 81 of an adjusting link 8 and can be pivoted about the pin. The release lever 3 has a drive portion 32 integrally coupled to the temperature compensation bimetal 31 and located opposite it across the pin 82. Adjusting link 8 can be pivoted about a shaft 83. The second portion 84 of adjusting link 8 is provided with a fine adjustment cam 85 disposed in contact with the eccentric cam 41 of an electrical current regulating knob 4 attached to the case 20 by a wire spring 42. An inversion spring 9 is provided alongside the thermal units 1 and attached to a support member 99 fitted in the groove 101 of the wall of case 20. The inversion spring 9 and the support member 99 constitute the inversion spring unit. The inversion spring unit and the release lever 3 constitute the inversion mechanism 90 of the relay.

Figure 2A:
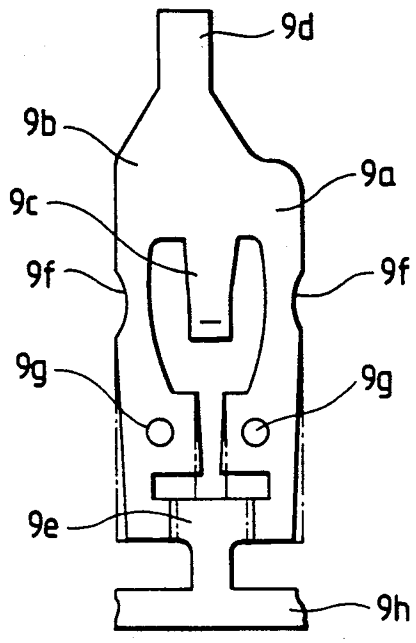
FIG. 2(A) is a plan view of the inversion spring shown in FIG. 1.
Figure 2B:
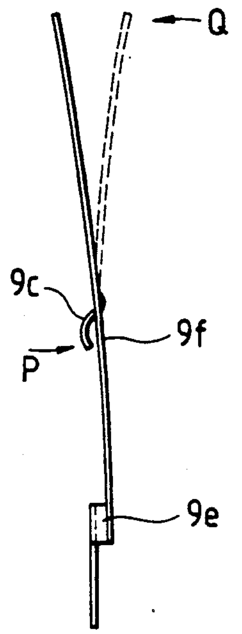
FIG. 2(B) is a side view of the inversion spring depicted in FIG. 2(A)

As shown in FIG. 2, the spring plate means is the inversion spring 9. Inversion spring 9 is made of a thin spring plate, which is cut (e.g., through punching) so that the spring is formed with both slender side portions 9*a* and 9*b* disposed about central axis 9*i*, a central lug 9*c* and a slender tip portion 9*d*. The spring 9 is provided with a projection 9*e* opposite the tip portion 9*d*. Projection 9*e* is attached by bending the plate so that both the side slender portions 9*a* and 9*b* approach each other in the same plane (e.g., the side portions are bent towards each other), from positions shown by the single-dot chain lines of FIG. 2, to those shown by full lines. As a result, the inversion spring 9 is kept curved, with a large radius of curvature, leftward of arc-shaped notches 9*f* of the outer parts of both the slender side portions 9*a* and 9*b* as shown by a solid line in FIG. 2(B). When the central lug 9*c* of the inversion spring 9 curved as shown by the solid line in FIG. 2(B) is pushed in a direction P so that the curvature of spring 9 extends beyond a prescribed dead point, the posture of the spring is immediately inverted so that the spring is curved rightward form the positions of the arc-shaped notches 9*f* as shown by a dotted line in FIG. 2(B). If the tip of the inversion spring 9 is then pushed in a direction Q, the posture of the spring is inverted back as shown by the solid line in FIG. 2(B).

Figure 3A:
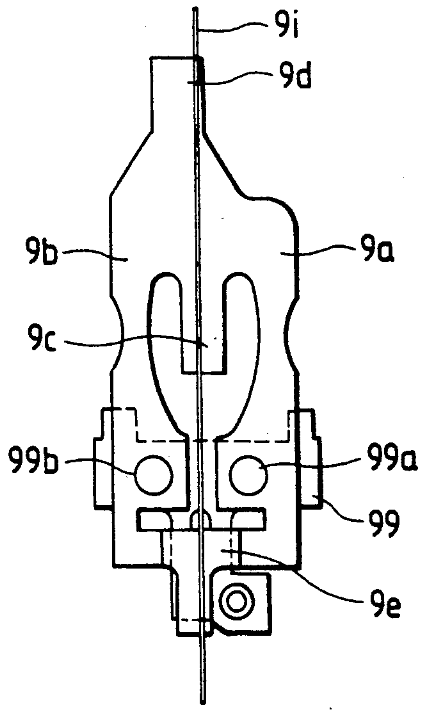
FIG. 3(A) is a plan view of the inversion spring unit of FIG. 1 wherein the inversion spring secured to a support member.
Figure 3B:
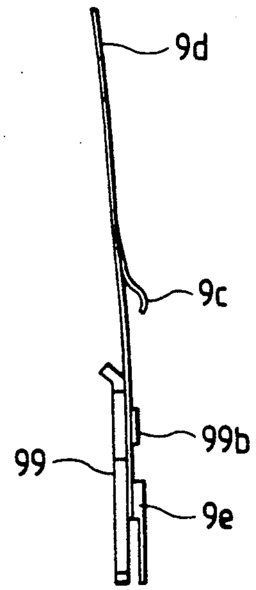
FIG. 3(B) is a side view of the inversion spring unit shown in FIG. 3(A)
Figure 5:
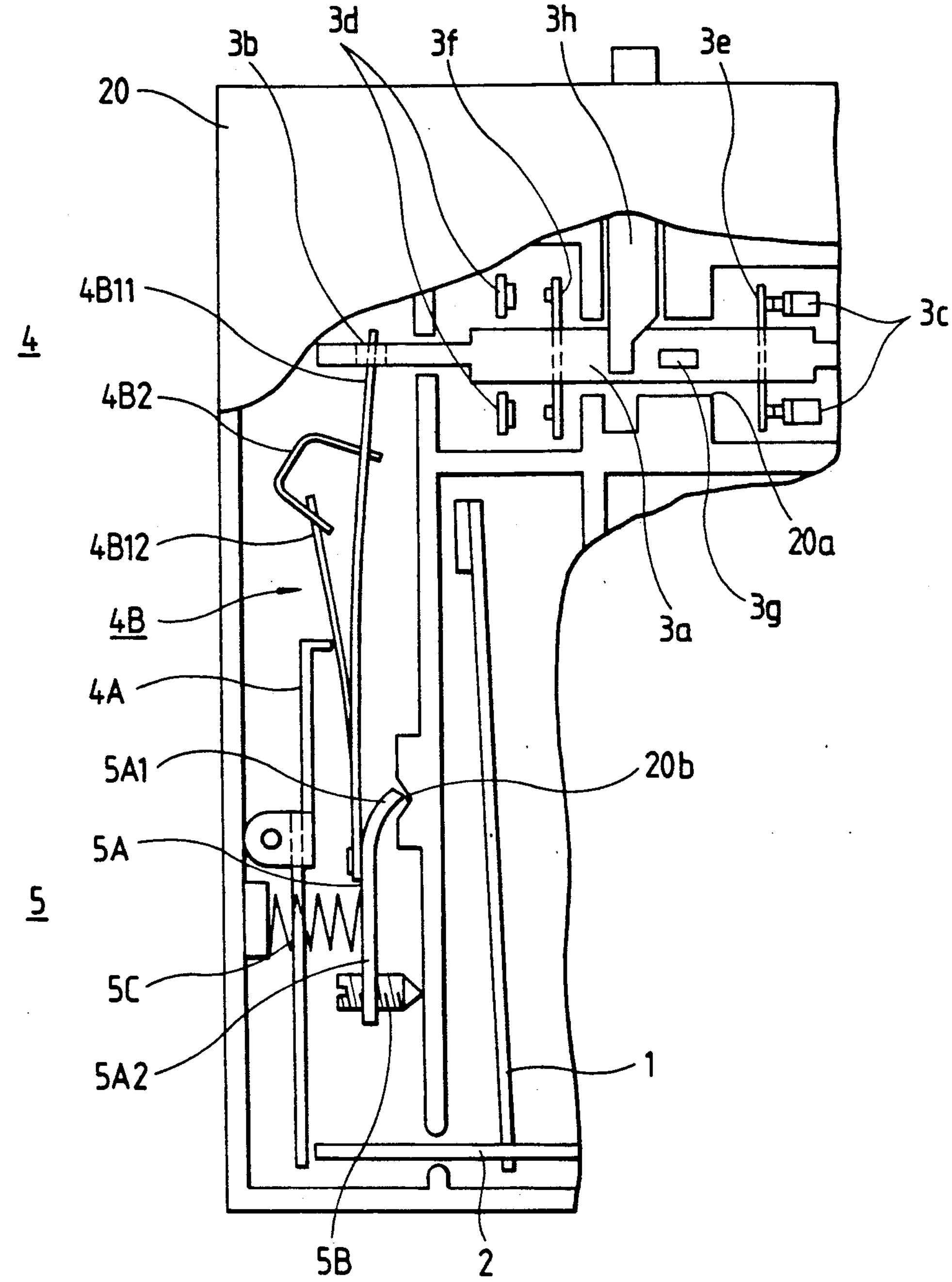
FIG. 5 PRIOR ART
FIG. 5 is a sectional view of a major part of a conventional thermal overload relay in the reset position.
Figure 6:
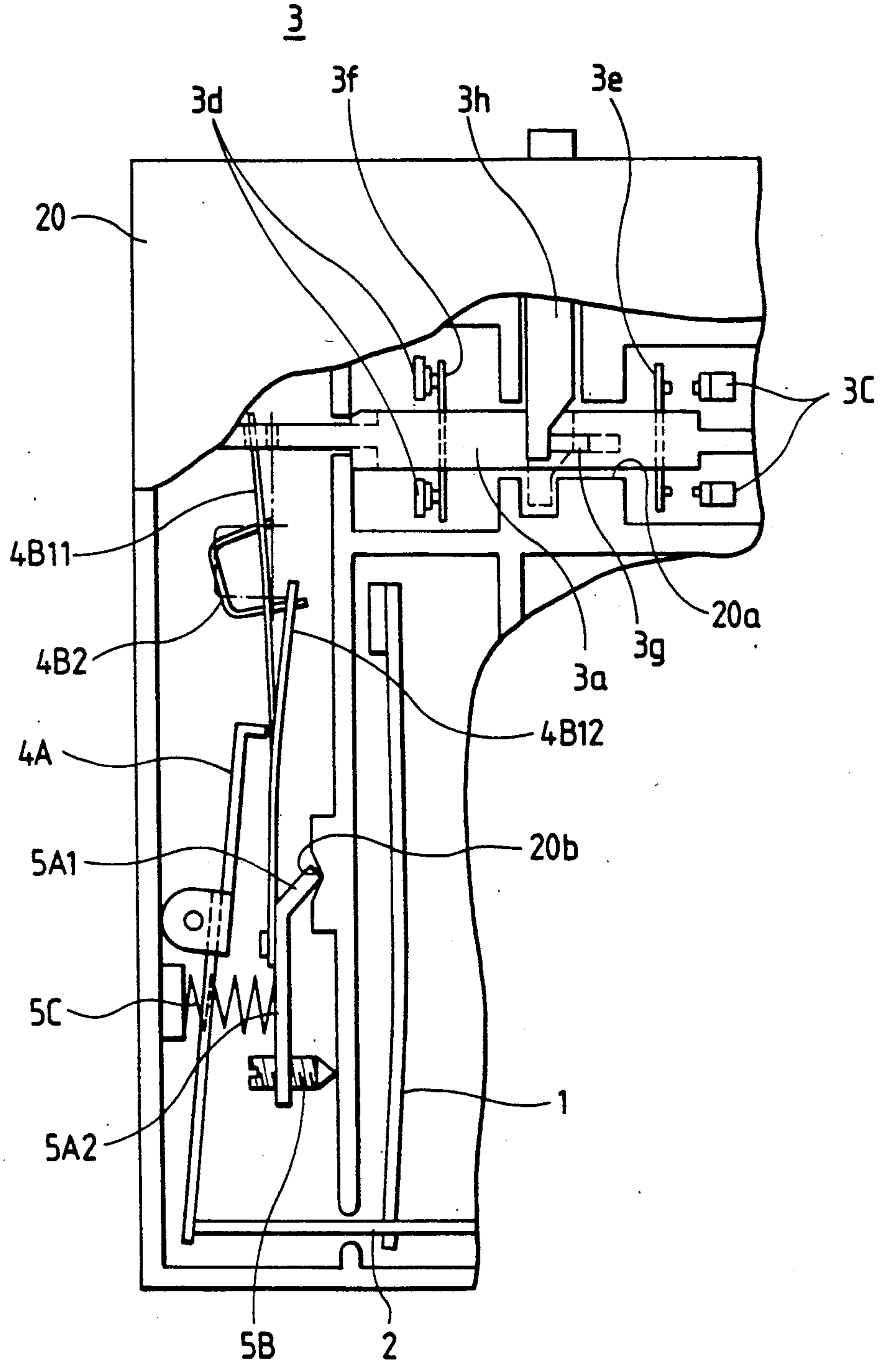
FIG. 6 PRIOR ART
FIG. 6 is a sectional view of a major part of a major part of a conventional thermal overload relay in the set position.
Figure 7:
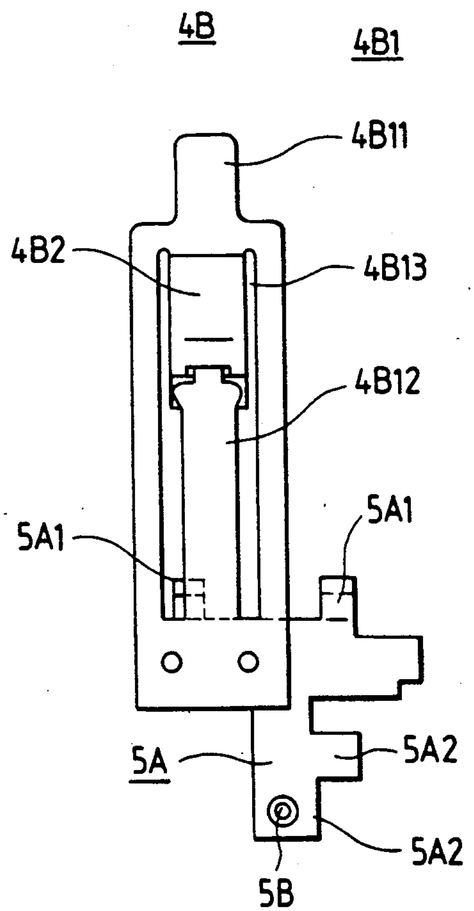
FIG. 7 PRIOR ART
FIG. 7 is a front view of the inversion spring unit of the conventional relay.
Figure 8:
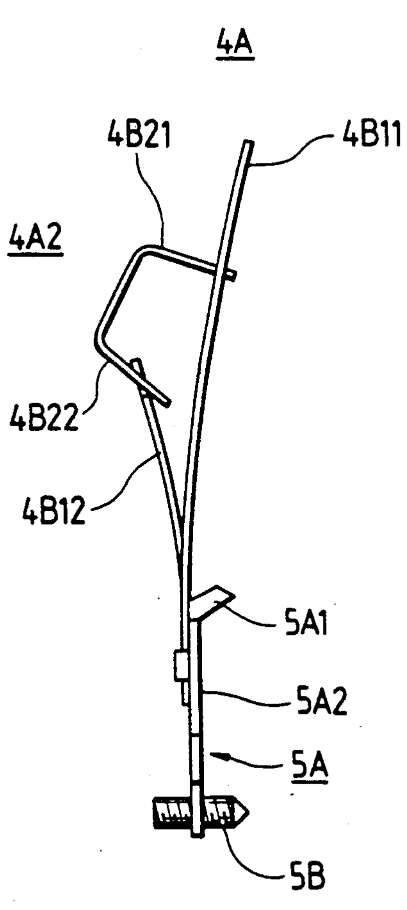
FIG. 8 PRIOR ART
FIG. 8 is a side view of the inversion spring unit of the conventional relay.

In order to manufacture the inversion spring unit, the thin spring plate is first punched by a press with a cope or notched member and a drag or block to have an outline shown by the single-dotted chain lines and solid lines in FIG. 2(A). A coupling portion 9*h* is also formed and holes 9*g* are made in both the slender side portions 9*a* and 9*b*. The punched plate is then bent so that it is provided with the projection 9*e*. The projections 99*a* and 99*b* of the support member 99 of right rigidity are then inserted in the holes 9*g* of the slender side portion 9*a* and 9*b* and calked thereto so that the support member 99 is secured to the inversion spring as shown in FIG. 3. After that, the coupling portion 9*h* is cut off, thus completing the inversion spring unit. A screw 98 for adjusting the position of the inversion spring unit is engaged in the support member 99.

Figure 4:
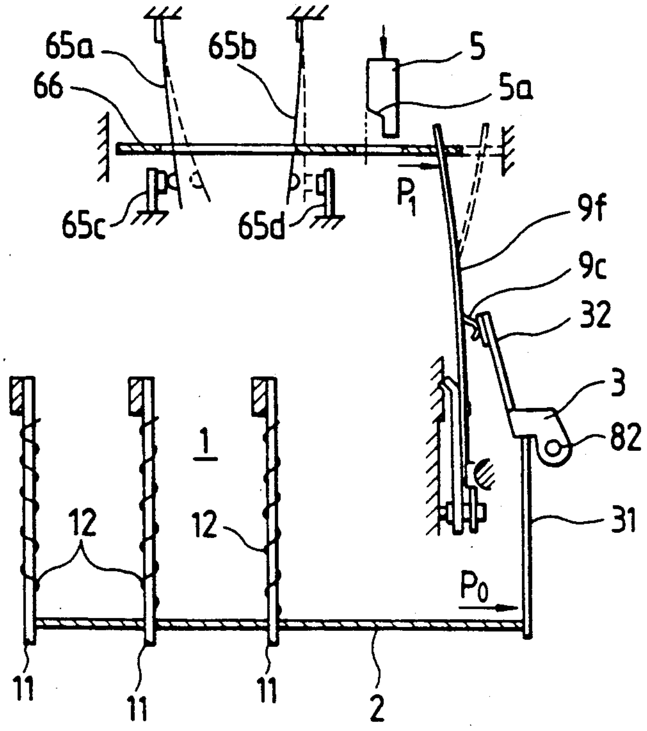
FIG. 4 is a view for depicting the operation of the relay of FIG. 1.

The operation of the thermal overload relay will now be described with reference to FIG. 4. If an overcurrent flows through the main three-phase circuit so that the bimetal 11 is bent, the shifter 2 is moved in a direction P0 to push the temperature compensation bimetal 31. As a result, the release lever 3 is pivoted counterclockwise about the pin 82 so that the drive portion 32 of the lever pushes the central lug 9*c* of the inversion spring 9. When the central lug 9*c* is pushed beyond the dead point by the drive portion 32, the curvature of the spring 9 beginning at a point proximate the notches 9*f* is reversed so that the spring is inverted from a posture shown by a full line in FIG. 4, to that shown by a dotted line therein. As a result, the slider 66 is moved in a direction P1 by the driving force of the spring 9. This causes the movable contact plate spring 65*b* to be moved from positions shown by full lines in FIG. 4, to those shown by dotted lines therein. At that time, the plate spring 65*a* is disengaged from fixed contact 65*c* and the other plate spring 65*b* is disengaged from fixed contact 65*d*, so that the overcurrent is prevented from flowing through the main three-phase circuit. To reset the relay, a resetting lever 5 is pushed so that the slope 5*a* thereof moves the slider 66 in a direction opposite to that P1. As a result, the inversion spring 9 is inverted back from the posture shown by the dotted line in FIG. 4, to that shown by the full line therein.

Additional advantages and modifications will readily occur to those skilled in the art. The invention in its broader aspects is, therefore, not limited to the specific details, representative apparatus and illustrative example shown and described. Accordingly, departures may be made from such details without departing from the spirit or scope of the general inventive concept as defined by the appended claims and their equivalents.

What is claimed is:

1. A method for manufacturing an inversion spring unit for an electrical relay, comprising the steps of:

cutting a spring plate out of a single piece of metal, the plate having a central axis, coplanar side portions disposed on either side of the central axis, a first end and a second end, a coupling portion extending between and connecting said side portions at said first end, a lug portion disposed intermediate said ends between said side portions, and openings disposed in said side portions, said openings being spaced a predetermined distance from said coupling portion;

bending said coupling portion to cause said side portions to move towards each other proximate said first end and to cause said second end of said spring to curve away from said central axis; and fastening said spring plate in an area intermediate said first and second ends to a support member.

2. A method according to claim 1, wherein the step of cutting includes cutting an opening in each of said side portions, and wherein said support member includes projections for disposal in said openings, said step of fastening including inserting said projections in said openings.

3. A method according to claim 2, wherein said step of fastening further includes calking said projections in said openings.

4. A method according to claim 1, wherein said step of bending includes bending said spring plate at said first end between said side portions in a direction perpendicular to the plane of said side portions to cause said side portions to move in directions towards each other.

5. A method according to claim 1, further comprising the step of bending said lug portion to protrude from said spring plate.

6. A method according to claim 1, wherein the step of cutting further includes forming a notch in each of said side portions.

7. A method according to claim 1, further including the step of removing at least a portion of said coupling portion after the step of fastening.

8. A method according to claim 1, wherein the step of cutting includes forming an extension in each of said side portions, each of said extensions including one of said openings disposed therein, and each of said extension disposed between said first and second ends and extending towards said central axis.

9. A method for manufacturing an inversion spring unit for an electrical relay, comprising the steps of:

cutting a spring plate out of a single piece of metal, the plate having a central axis, coplanar side portions disposed on either side of the central axis, a first end and a second end, a lug portion disposed intermediate said ends between said side portions, and a coupling portion extending between said side portions, said side portions each having an opening disposed therein at intermediate locations thereon spaced from said coupling portion;

bending said coupling portion in a direction perpendicular to the plane of said side portions to cause said side portions to move towards each other and to cause said second end of said spring plate to curve away from said central axis; and fastening said spring plate in an area proximate said first end to a support member having projections for disposal in the openings of said side portions, the step of fastening including caulking said projections in said openings.

* * * * *